(12) United States Patent
Nagata et al.

(10) Patent No.: US 7,467,394 B2
(45) Date of Patent: Dec. 16, 2008

(54) RECORDING MEDIUM DRIVE

(75) Inventors: Hitoshi Nagata, Tokorozawa (JP);
Yoshimitsu Fukushima, Tokorozawa (JP); Yuji Morita, Tokorozawa (JP);
Takeshi Kadowaki, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 275 days.

(21) Appl. No.: 10/570,953

(22) PCT Filed: Sep. 8, 2004

(86) PCT No.: PCT/JP2004/013059

§ 371 (c)(1),
(2), (4) Date: Mar. 7, 2006

(87) PCT Pub. No.: WO2005/027113

PCT Pub. Date: Mar. 24, 2005

(65) Prior Publication Data

US 2006/0288357 A1 Dec. 21, 2006

(30) Foreign Application Priority Data

Sep. 9, 2003 (JP) ............................. 2003-316697
Jun. 29, 2004 (JP) ............................. 2004-191209

(51) Int. Cl.
*G11B 17/057* (2006.01)
*G11B 17/04* (2006.01)

(52) U.S. Cl. .................................................. 720/616
(58) Field of Classification Search ................ 720/601, 720/615, 616, 627
See application file for complete search history.

(56) References Cited

U.S. PATENT DOCUMENTS

| 5,878,013 | A   | * | 3/1999  | Maeda et al. ............... 720/606 |
| 6,421,311 | B1  | * | 7/2002  | Nakazato et al. ............ 720/604 |
| 6,538,971 | B2  | * | 3/2003  | Seo et al. .................... 720/616 |
| 7,003,784 | B2  | * | 2/2006  | Naoki ......................... 720/601 |
| 2004/0205784 | A1 | * | 10/2004 | Naoki ......................... 720/601 |

FOREIGN PATENT DOCUMENTS

| JP | 09007267 A | * | 1/1997 |
| JP | 9-91821    |   | 4/1997 |
| JP | 9-167420   |   | 6/1997 |

(Continued)

*Primary Examiner*—William J Klimowicz
(74) *Attorney, Agent, or Firm*—Kratz, Quintos & Hanson, LLP

(57) ABSTRACT

The tray 30, which can mount both of a cartridge type recording medium and a bare-disc type recording medium, includes a placing surface 31 having a detection hole 34 for detecting information of the recording medium; a rising portion 32 formed so as to rise from the placing surface 31 at a front side end. The rising portion 32 has a disc holder 35 rotatably provided for positioning the bare-disc type recording medium. Hence, the disc holder 35 can be moved to an accommodation position A for being displaced not to cover the detection hole 34 in the placing surface 31. Accordingly, an area on the placing surface 31, in which detection portions such as the detection hole 34 are formed becomes wider, so that the detection portions such as the detection hole 34 can be sufficiently formed as well as a space for providing the detection portions corresponding to a cartridge containing a variety of information can be sufficiently obtained.

6 Claims, 13 Drawing Sheets

FOREIGN PATENT DOCUMENTS

| | | | |
|---|---|---|---|
| JP | 09320161 A | * | 12/1997 |
| JP | 10-64150 | | 3/1998 |
| JP | 10199089 A | * | 7/1998 |
| JP | 2882321 | | 2/1999 |
| JP | 3012172 | | 12/1999 |
| JP | 2000156016 A | * | 6/2000 |

* cited by examiner

US 7,467,394 B2

RECORDING MEDIUM DRIVE

TECHNICAL FIELD

The present invention relates to a recording medium drive that houses a recording medium placed on a tray of the drive.

BACKGROUND ART

A recording/reproducing device has been used for reproducing information from an optical recording medium or for recording information on a recording medium. The recording/reproducing device houses the recording medium therein and rotates the recording medium at high speed such that a recording/reproducing mechanism can read or write information.

The recording medium includes a bare-disc type used with a recording surface exposed such as a CD (Compact Disc) and a cartridge type used with a recording surface housed in a cartridge to be protected such as an MD (Mini Disc), a DVD-RAM (Digital Versatile Disc-Random Access Memory) and a Blu-ray Disc. An on-tray type recording/reproducing device, which can read from and write on both of the bare-disc type and the cartridge type, has been watched.

Among the on-tray types, there has been a recording/reproducing device having a disc holder for positioning the recording medium on a placing surface of the tray (e.g., Patent Document 1).

In the conventional recording/reproducing device, the disc holder is upwardly projected to contact with a circumference of a disc body for positioning of the disc when holding the bare-disc type and is pressed down for mounting the cartridge when holding the cartridge type. The cartridge type also has a cartridge information portion on an end thereof such as a claw and a hole for selecting whether the recording medium is to be writable or unwritable. The placing surface of the tray has a detection hole defined at a position corresponding to the position of the cartridge information portion and in a common plane of the disc holder and the placing surface. A detection pin is inserted through the detection hole to check information such as whether the cartridge type is set to be writable.

[Patent Document 1] Japanese Patent Publication No. 2882321 (FIG. 1)

DISCLOSURE OF THE INVENTION

Problems to be Solved by the Invention

However, in the prior art, since the disc holder and the detection hole are provided in the same plane of the placing surface of the disc, the position of the detection hole or the disc holder is restricted, so that the placing surface of the tray cannot be effectively utilized. Meanwhile, study in large-capacity optical recording medium has been rapidly advanced. Specifically, the cartridge information portion defined at an end of the disc need not be limited to the claw for selecting the disc writable or unwritable, but another cartridge type in which a plurality of cartridge information portions can contain other disc information has been developed. When such cartridge type having the plurality of cartridge information portions is placed on the tray with the disc holder provided on the placing surface, detection portions are restricted due to the disc holder, hindering precise transmission of the information on the cartridge.

The present invention intends to solve the problem, which is described above as an example, and provide a recording medium drive that can effectively utilize the placing surface of the tray.

Means for Solving the Problems

The recording medium drive according to the present invention includes the tray that can mount both of the cartridge type recording medium and the bare-disc type recording medium and at least reproduces information from or records information on the recording medium. The tray has the placing surface for placing the recording medium, the rising portion formed so as to rise relative to the placing surface and the disc holder that is provided to the rising portion and rotatable at least between the position for determining where to place the bare-disc type recording medium and the position for being displaced from the cartridge type recording medium. The disc holder is rotatable between: a horizontal setting supporting position for guiding a circumference of the bare-disc type recording medium when the bare-disc type recording medium is horizontally set; and a vertical setting supporting position where the circumference of the bare-disc type recording medium and a tip end of the disc holder contact with each other when the bare-disc type recording medium is vertically set and the circumference of the bare-disc type recording medium is supported between the placing surface and the holder piece.

EXPLANATION OF CODES

30: tray, 31: placing surface, 32: rising portion, 33: positioning member, 34: detection hole, 35: disc holder, 100: recording medium drive, 312: circular recessed portion, 351: holder piece, 611: pin

BEST MODE FOR CARRYING OUT THE INVENTION

First Embodiment

A first embodiment of the present invention will be described with reference to the attached exemplary drawings.

In the description below, "horizontally set" means a recording medium drive is set such that a placing surface of a tray thereof is substantially parallel to a plane on which the recording medium drive is set. In the horizontal setting, the placing surface of the tray is horizontal relative to the plane on which the recording medium drive is set.

On the other hand, "vertically set" means "longitudinally set." In other words, it means the recording medium drive is set such that the placing surface of the tray is substantially orthogonal to the surface on which the recording medium drive is set. In the vertical setting, the placing surface of the tray is vertical relative to the plane on which the recording medium drive is set.

[Arrangement of Recording Medium Drive]

Figure 1:
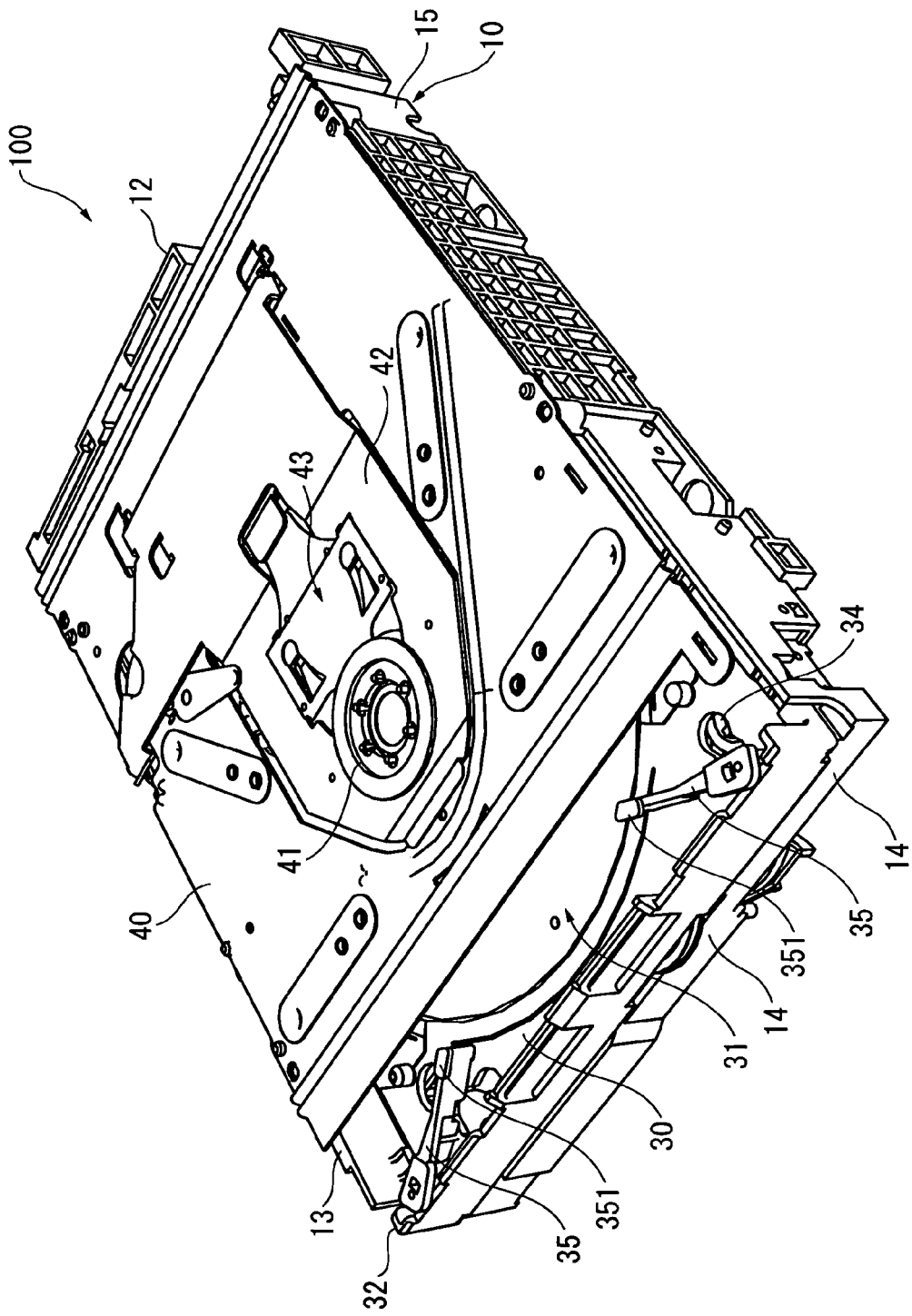
FIG. 1 is an overall perspective view of a recording medium drive of a first embodiment.
Figure 2:
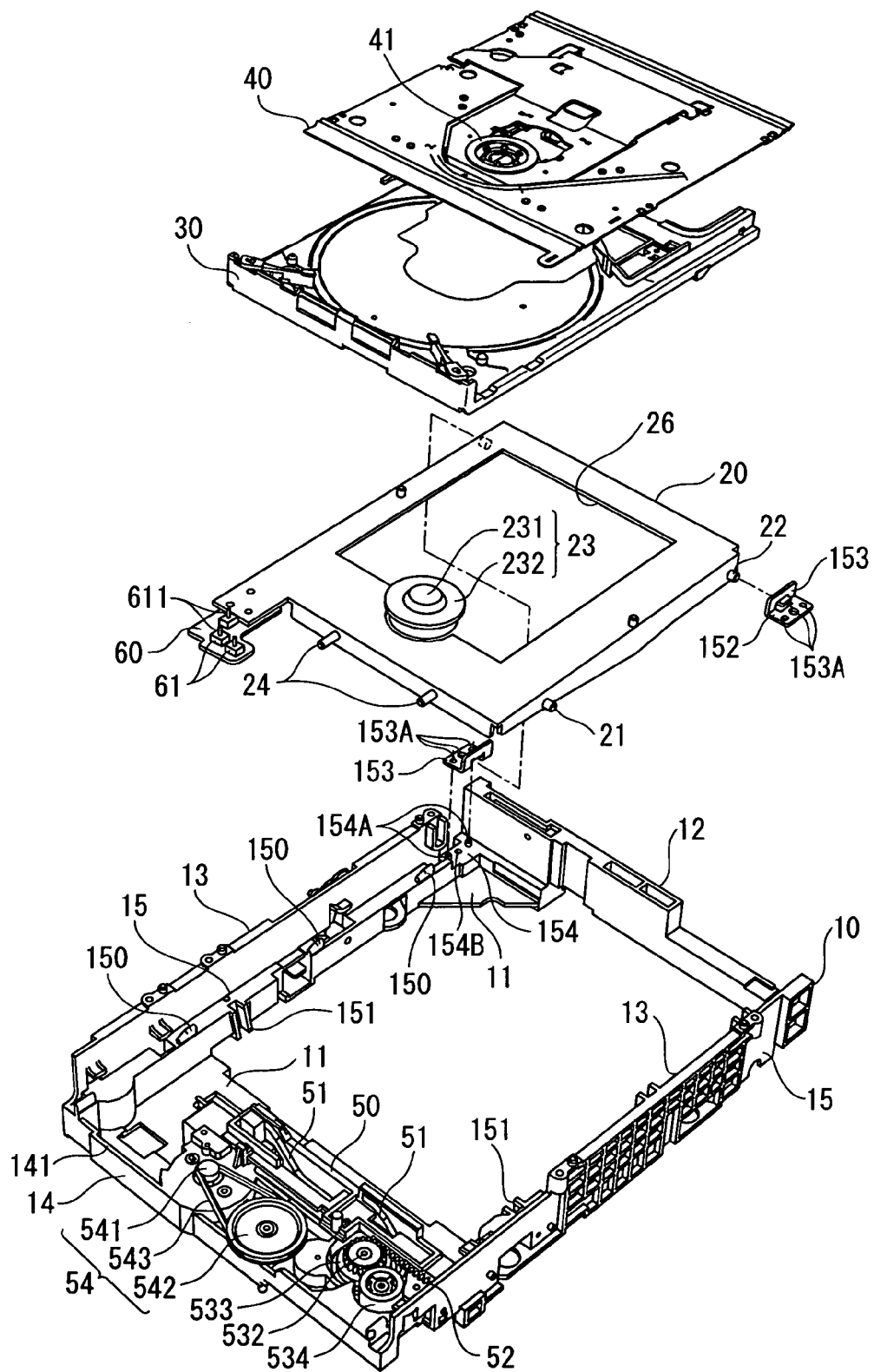
FIG. 2 is an exploded perspective view of the recording medium drive.

FIGS. 1 to 9 show the recording medium drive of the first embodiment. FIG. 1 is an overall perspective view of the recording medium drive of the first embodiment according to the invention. FIG. 2 is an exploded perspective view of the recording medium drive of the first embodiment.

In FIGS. 1 and 2, the reference numeral 100 is assigned to a recording medium drive that records information on and/or reproduces information from a substantially flat recording medium. The recording medium drive 100 includes a frame 10 being substantially rectangular in plan view, a base 20 attached in the frame 10, a tray 30 adapted to eject from/retract into the frame 10, a clamp mechanism 40 disposed on the frame 10 and a metal casing (not shown) covering an outer circumference of the frame. The recording medium drive 100 can be set in both ways of the horizontal setting and the vertical setting in which the recording medium is respectively placed horizontally and vertically.

[Recording Medium Reproducible and/or Recordable with Recording Medium Drive]

Figure 10:
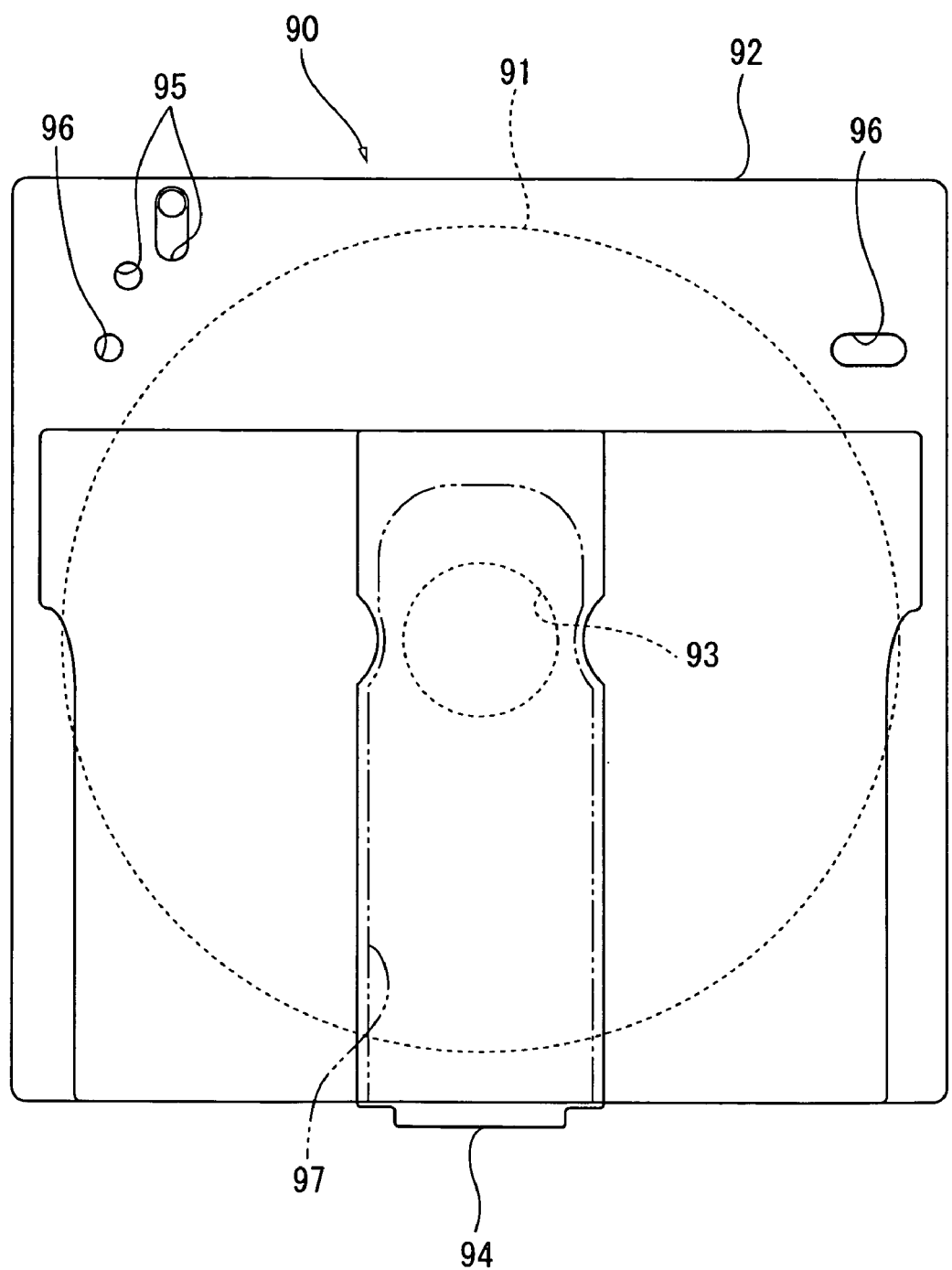
FIG. 10 is a front view showing a recording medium used for the recording medium drive of the invention.

The recording medium used with the recording medium drive 100 includes a bare-disc type recording medium such as a CD, which is a disc 91 to be used as itself and a cartridge type recording medium 90 of which disc 91 is housed in a cartridge 92 (see FIG. 10). The disc 91 has a discoid shape with a circular hole 93 defined at the center thereof. A surface of the disc 91 is a recording surface. The cartridge 92 of the cartridge type recording medium 90 has a window 97 defined from a circumference toward the center thereof. The disc 91 housed inside can be reproduced and/or recorded through the window 97. A cover 94 is provided to protect the disc 91 from being damaged through the window 97 when reproduction and/or recording is not conducted. The cover 94 is slidable toward either of the two sides next to a side in which the window 97 is defined. The cover 94 is slid to open the window 97. The cartridge 92 has a cartridge information portion 95 at an end or both ends. The cartridge information portion 95 includes a switching portion to switch whether writing on the disc 91 is to be allowed or not.

[Arrangement of Frame 10]

In FIG. 2, the frame 10 is made of synthetic resin or the like. The frame 10 includes a flat bottom portion 11 being rectangular in plan view, a rear portion 12 integrally formed with the bottom portion 11 on a short-side periphery of the bottom portion 11, a front portion 14 integrally formed with the bottom portion 11 on another short-side periphery so as to rise from the bottom portion 11 and two lateral portions 15 integrally formed with the bottom portion 11 on long-side peripheries so as to have a substantially same height as the rear portion 12. The lateral portions 15 and the rear portion 12 forms an upper open portion 13 above the bottom portion 11.

Regardless of whether the recording medium drive 100 is set horizontally or vertically, the recording medium drive 100 will be described based on the definition in which the upper open portion 13 side is the upper side; the bottom portion 11 side is the bottom side; the rear portion 12 side is the rear side; and the front portion 14 side is the front side. In addition, a direction from the front side toward the rear side is defined as the advancement direction; the direction opposite to the advancement direction is the retreat direction, directions from the upper side and the bottom side and vice versa are the up-down directions; and directions from one lateral portion to the other lateral portion and vice versa, which are orthogonal to the advancement and retreat directions and the up-down directions, are the lateral directions.

The lateral portions 15, the front portion 14 and the rear portion 12 are provided on the peripheries of the bottom portion 11, forming an enclosed large open space. The open space above the bottom portion 11 is for accommodating an electric circuit (not shown), which controls the recording medium drive 100.

The rear portion 12 has an external terminal (not shown) on the bottom side. The external terminal is electrically connected in the frame with the electric circuit on the bottom portion 11. The external terminal has a power source cable connector for supplying electricity to the recording medium drive and an external terminal connector for connecting with external equipment such as a personal computer to communicate with the outside. Information reproduced and/or recorded by the recording medium drive 100 is mainly input/output through the external terminal.

Sliding pieces 150 for slidably supporting the tray 30 are provided to inner walls of the lateral portions 15 along the forward and backward directions The base 20 is movably attached on the rear side of the lateral portions 15.

The front portion 14 is formed so as to have a smaller length in the up-down directions as compared to the rear portion 12 and the lateral portions 15. An open portion 141 is formed on the upper side of the front portion, through which the tray 30 is ejected and retracted. An operating unit (not shown) is provided on the front portion 14 and is connected to the electric circuit on the bottom portion 11. The operating unit includes an eject button for ejecting and retracting the tray 30, a volume control for controlling sound volume and an insertion hole for an earphone.

The clamp mechanism 40, which is one of mechanisms for holding the recording medium, is attached to the upper open portion 13.

[Arrangement of Base 20]

Figure 3:
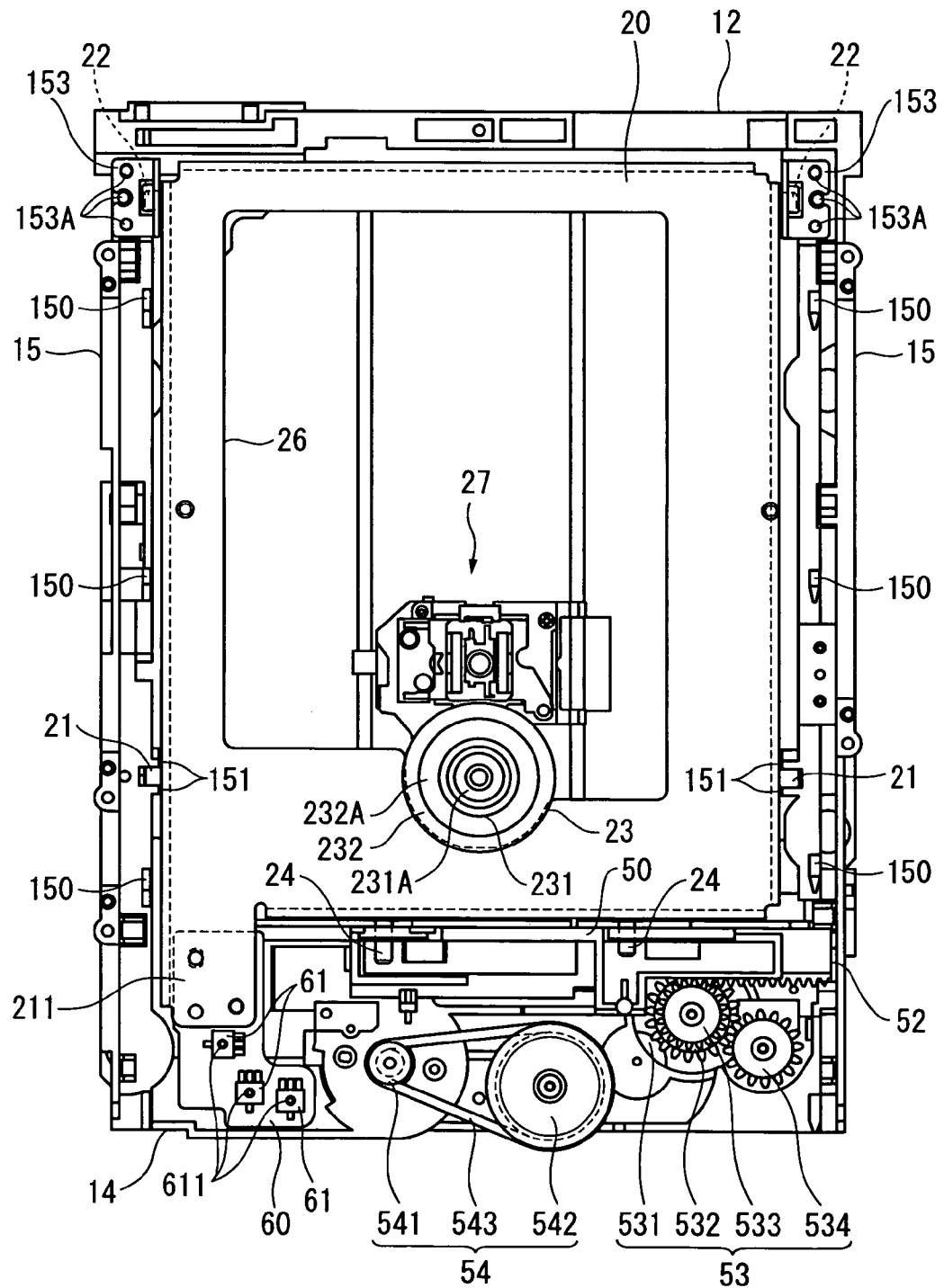
FIG. 3 is a front view showing the recording medium drive when the tray is ejected.
Figure 4:
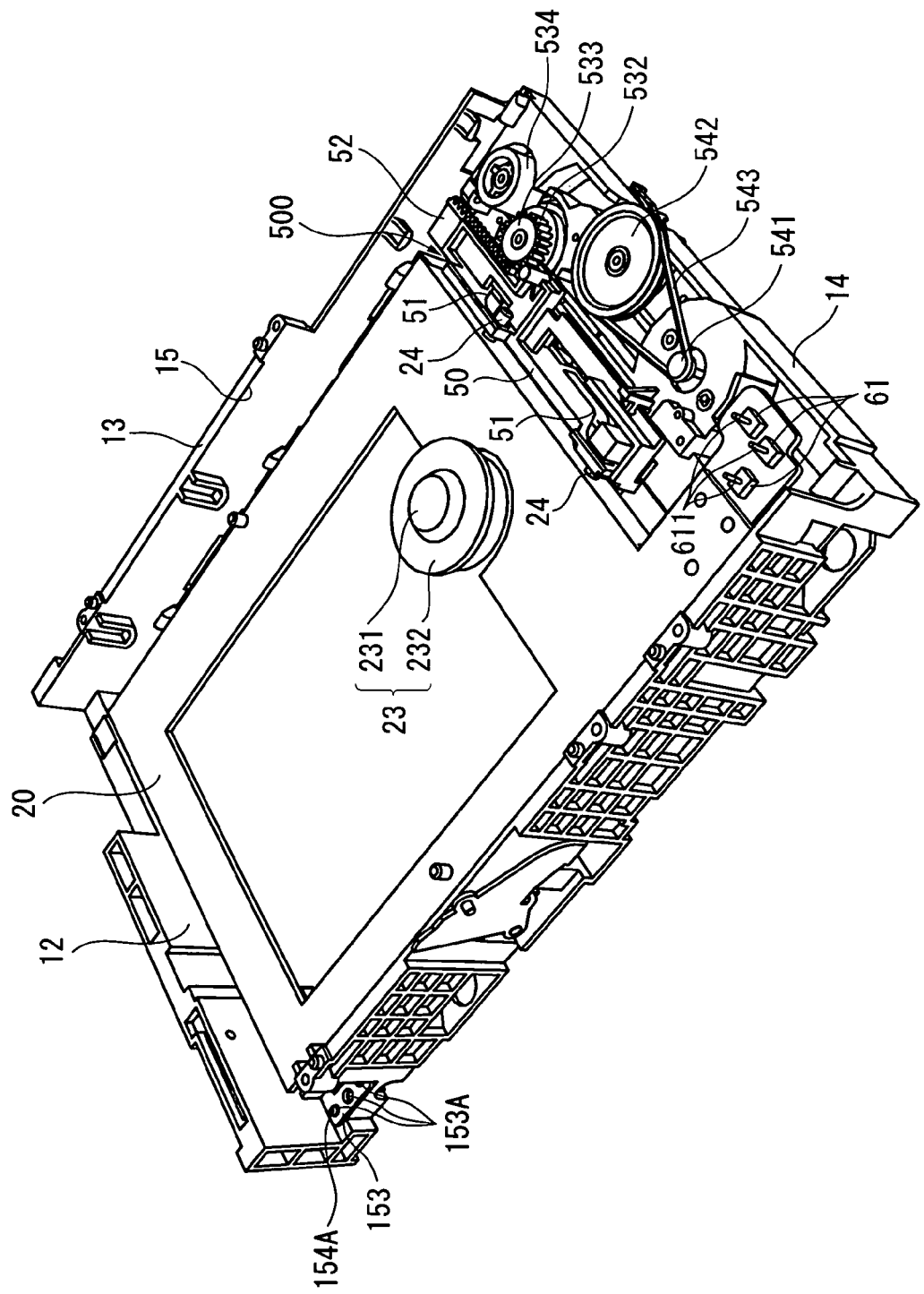
FIG. 4 is a perspective view of FIG. 3.

FIG. 3 is a front view of the recording medium drive 100 when the clamp mechanism 40 and the tray 30 are removed. FIG. 4 is an overall perspective view of the recording medium drive 100 when the clamp mechanism 40 and the tray 30 are removed.

In FIGS. 2 to 4, the base 20 is made by pressure-molding a metal plate material. A disc table 23 is attached to the base 20 at a position away from the front side by a predetermined distance and substantially in the middle in the lateral directions. The disc table 23 is round in plan view and rotatable around a rotation axis in the up-down directions. The disc table 23 projects from an upper surface of the base 20 toward the upper side. A rotary drive mechanism (not shown) such as a motor is provided on the bottom side of the disc table 23 and is electrically connected by, e.g., a synthetic resin flexible board having the above described electric circuit and a pattern wiring. When an electric signal of a drive command is transmitted from the electric circuit, the rotary drive mechanism rotates the disc table 23 at high speed.

The disc table 23 includes a mounting portion 232 for mounting the recording medium and a tapered portion 231 formed at the center of the mounting portion 232 with a smaller diameter on the upper side. The tapered portion 231 is fitted with the circular hole 93 of the disc 91. As shown in FIG. 3, a magnet 231A is embedded in the tapered portion 231 on the upper side. A sheet 232A made of synthetic resin is adhered on the mounting portion 232 on the upper side to serve as a surface protector of the recording medium and as a slip stopper. The sheet 232A prevents the recording medium from slipping even when the disc table 23 is rotated at high speed, thereby protecting the recording surface of the recording medium from damage.

A recording/reproducing mechanism setting hole 26 is defined in the base 20 on the rear side relative to the disc table 23. A recording/reproducing mechanism 27 is provided in the recording/reproducing mechanism setting hole 26 (see FIG. 3). The recording/reproducing mechanism 27 is shown in FIG. 3, but omitted in the other figures. The recording/reproducing mechanism 27 records and/or reproduces information by irradiating a laser beam to the recording surface of the recording medium and is advanceable and retreatable in the advancement and retreat directions of the recording/reproducing mechanism setting hole 26 of the base 20. A flexible cable (not shown) made of synthetic resin is connected to a part of the recording/reproducing mechanism 27 to electrically connect the recording/reproducing mechanism 27 and the electric circuit.

A detection board attaching portion 211 projecting toward the front side is formed on one corner of the front side of the base 20. A flat plane detection board 60 is fixed to the detection board attaching portion 211 on the bottom side. The detection board 60 may be fixed by adhering with an adhesive material, using a screw, welding or the like. A detection switch 61 stands on the detection board 60 toward the upper side and is connected to the electric circuit via a wire (not shown) extending toward the bottom side of the base 20. A detection pin 611 is formed toward the upper side on a tip end portion of the detection switch 61.

[Attaching Base 20 to Frame 10]

Figure 5:
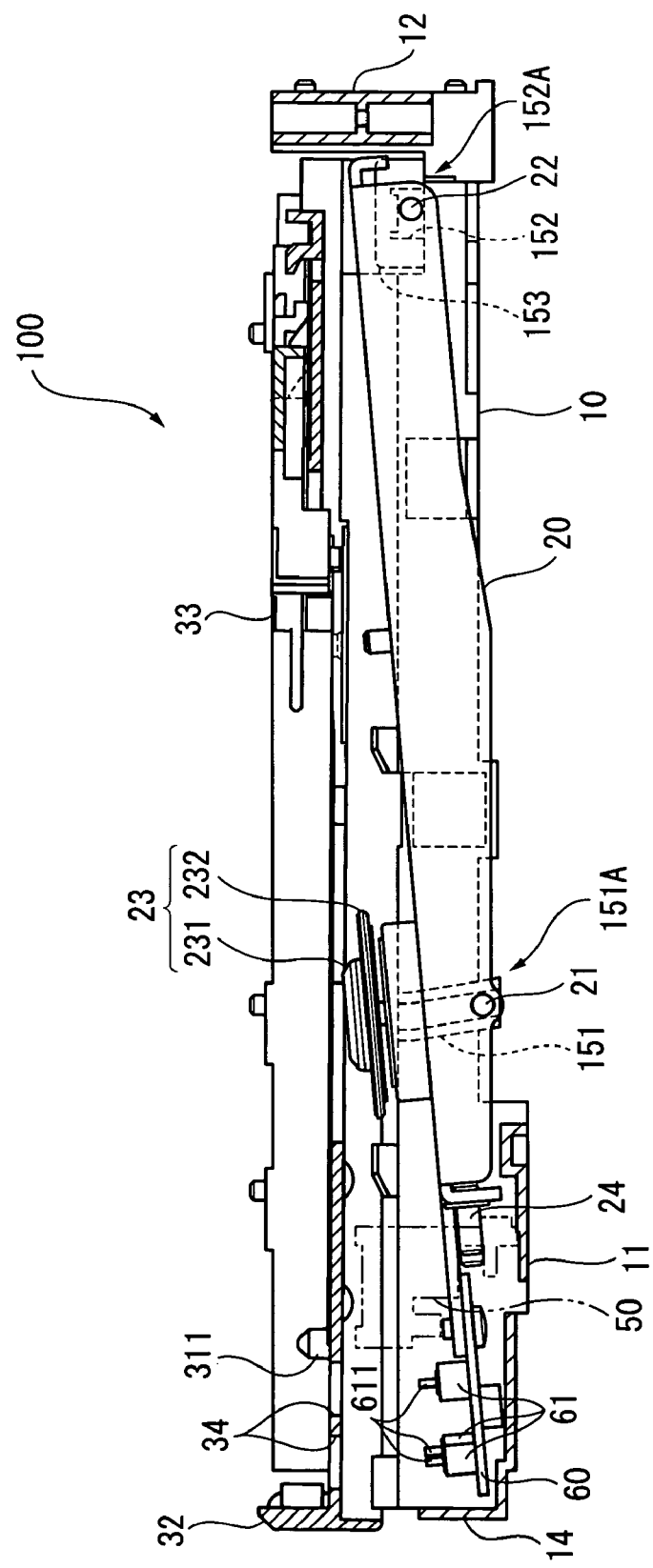
FIG. 5 is a sectional view of a frame and a base of the recording medium drive.
Figure 6:
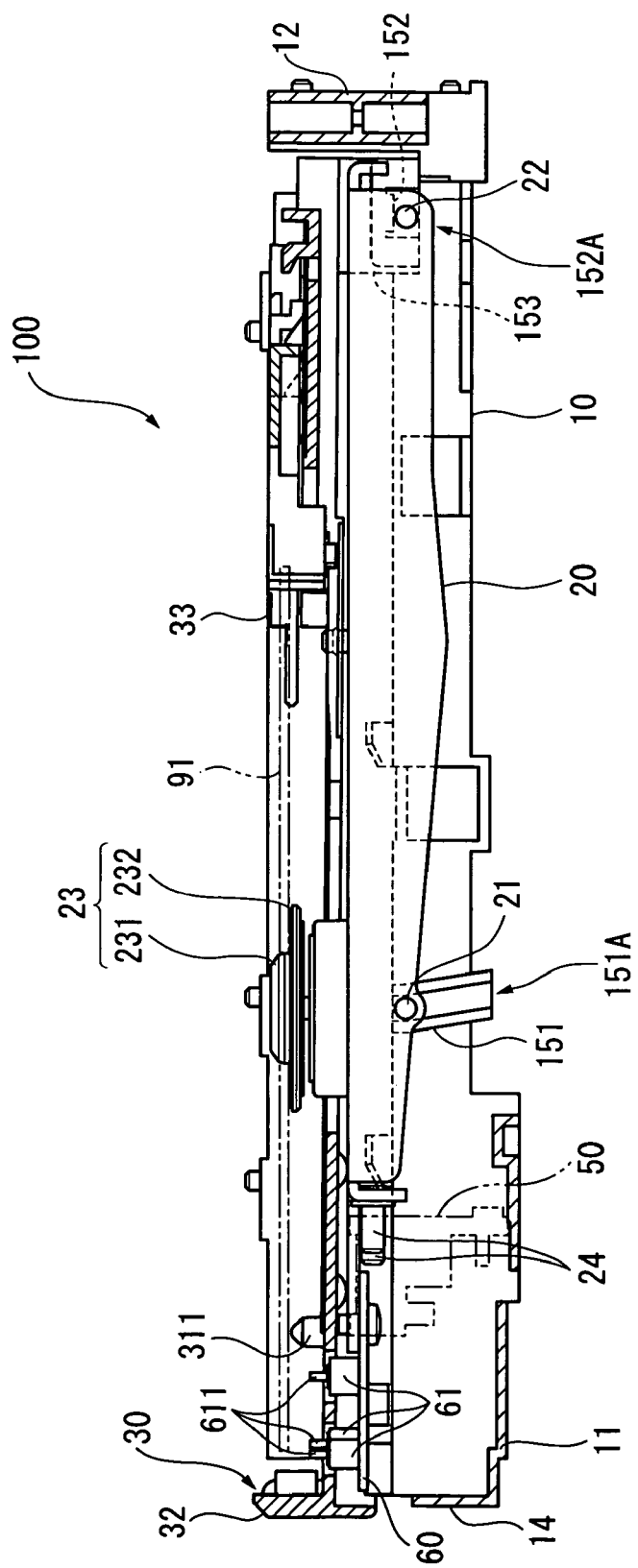
FIG. 6 is another sectional view of the frame and the base of the recording medium drive.

FIG. 5 is a sectional view of the recording medium drive 100. FIG. 6 is another sectional view of the recording medium drive 100.

As shown in FIGS. 2 to 6, a first axis 21 and a second axis 22 projecting toward the lateral portion 15 are provided on a lateral surface of the base 20. The first axis 21 is provided on both of the lateral surfaces of the base 20 on a line extending from substantially the center of the disc table 23 toward the lateral portion 15. The second axis 22 is provided on both of the lateral surfaces of the base 20 on the rear side.

A first guide groove 151 is integrally formed with the lateral portion 15 in an inner surface of the lateral portion 15 of the frame 10 at a position corresponding to the position of the first axis 21. That is, the first guide groove 151 is formed in the inner surface of the lateral portion 15 of the frame 10 at the position corresponding to the position of the first axis 21 provided on either outer surfaces of the base 20. The first guide groove 151 is somewhat inclined from the front side toward the rear side relative to the direction perpendicular to the bottom portion 11. The disc table 23 is on the upper side of the base 20, so that, when the first guide groove 151 is arranged to be perpendicular, the first axis 21 will move perpendicularly relative to a capture surface. However, since the base 20 attached to the frame 10 on the rear side swings, a movement track of the disc table 23 does not become perpendicular to the capture surface, but somewhat inclined. Hence, the first guide groove 151 is formed somewhat inclined to guide the movement track of the disc table 23 to be perpendicular relative to the capture surface.

An axis supporter 153 is fixed to an end of the lateral portion 15 on the rear side. The axis supporter 153 has a substantially L shape in cross section. The axis supporter 153 has three axis fixing holes 153A defined in one plane of the L shape and a second guide opening 152 (a second guide groove) defined along the advancement and retreat direction in the other plane. The lateral portion 15 has a flat section 154 on the rear side. The flat section 154 is for attaching the axis supporter 153 and has two bearing projections 154A projecting toward the upper side and a bearing hole 154B defined between the bearing projections 154A. The bearing projections 154A are fitted in the two axis fixing holes 153A at both ends. A screw is inserted in the axis fixing hole 153A at the center to be screwed in the bearing hole 154B. Thus, the axis supporter 153 is securely fixed to the flat section 154. The axis supporter 153 is attached such that the one plane having the second guide opening 152 is parallel to the inner wall of the lateral portion 15 via the other plane having the axis fixing holes 153A.

In the embodiment, the first axis 21 and the first guide groove 151 constitute a first guide mechanism 151A that guides such that the movement track of the substantial center of the disc table 23 is drawn perpendicular to the capture surface of the disc 91 and through the center of the recording medium. The second axis 22 and the second guide opening 152 constitute a second guide mechanism 152A for moving the base 20 in a direction intersecting the movement track of the disc table 23.

Here, the substantial center of the disc table 23 means a range including parts of the tapered portion 231 and the mounting portion 232, i.e., a range in which the circular hole 93 of the disc 91 and the tapered portion 231 of the disc table 23 smoothly engage with each other when the disc 91 is captured.

FIG. 5 is a side sectional view showing a state where the base 20 is at a position farthest from the capture surface of the recording medium (a waiting position). FIG. 6 is another side sectional view showing a state where the recording medium is on the capture surface (at a capture position). As shown in FIGS. 5 and 6, when the base 20 is at the waiting position, the first axis 21 is positioned lowest in the first guide groove 151 and the second axis 22 is moved on the rear side of the second guide opening 152. On the other hand, when the recording medium is at the capture position, the first axis 21 is moved to the upper side in the first guide groove 151 and the second axis 22 is moved on the front side of the second guide opening 152. Thus, the first guide mechanism 151A and the second guide mechanism 152A control the movement of the base 20 such that the base 20 swings with the substantial center of the disc table 23 perpendicularly to the capture surface. In the embodiment, the substantial center of the disc table 23 is arranged to swing perpendicularly to the capture surface, but the present invention is not limited thereto. The disc table 23 may be swung substantially perpendicularly in a range where the tapered portion 231 is fitted in the circular hole of the recording medium.

[Arrangement of Tray 30]

Figure 7:
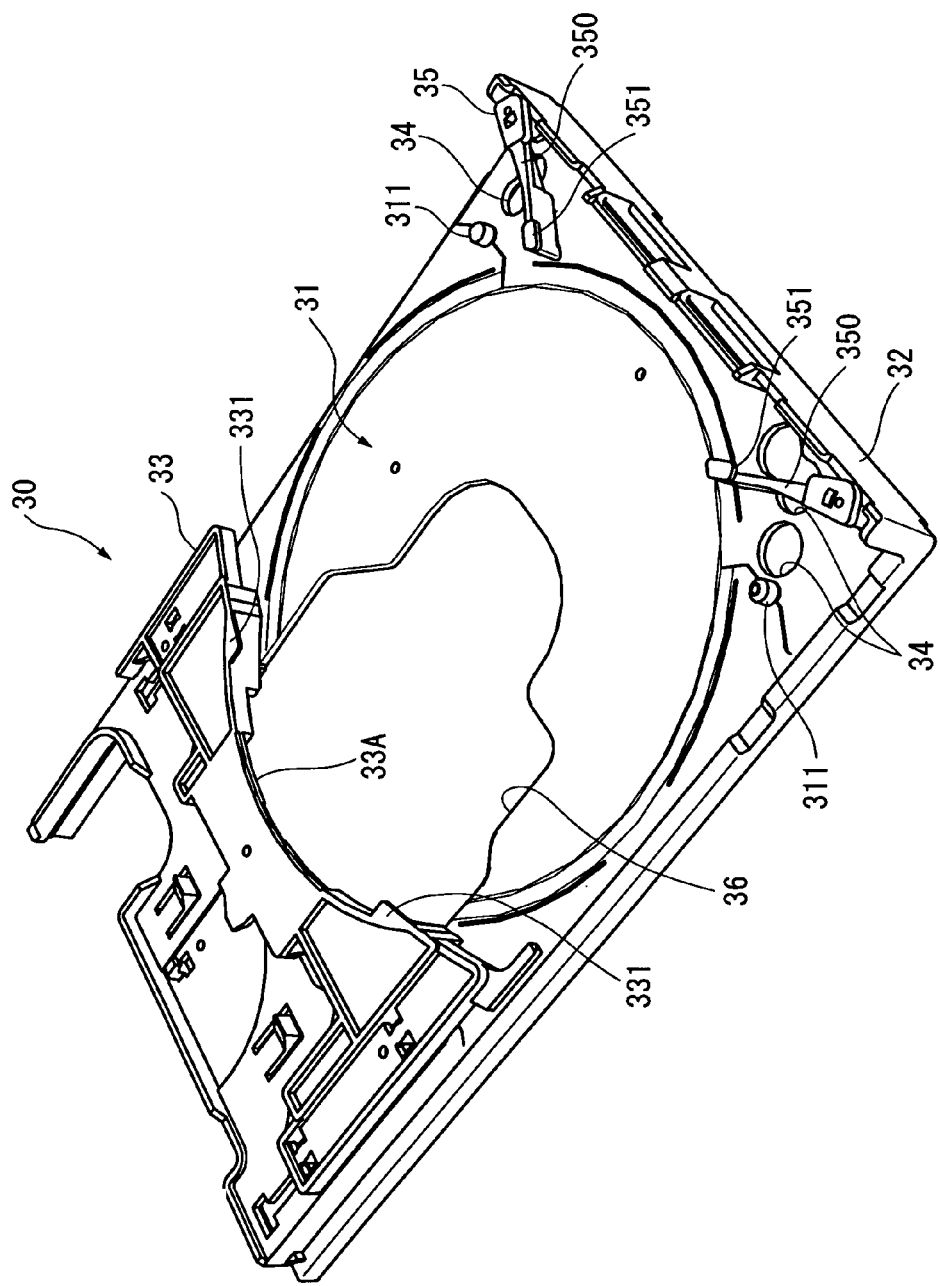
FIG. 7 is a perspective view of the tray of the recording medium drive.
Figure 8:
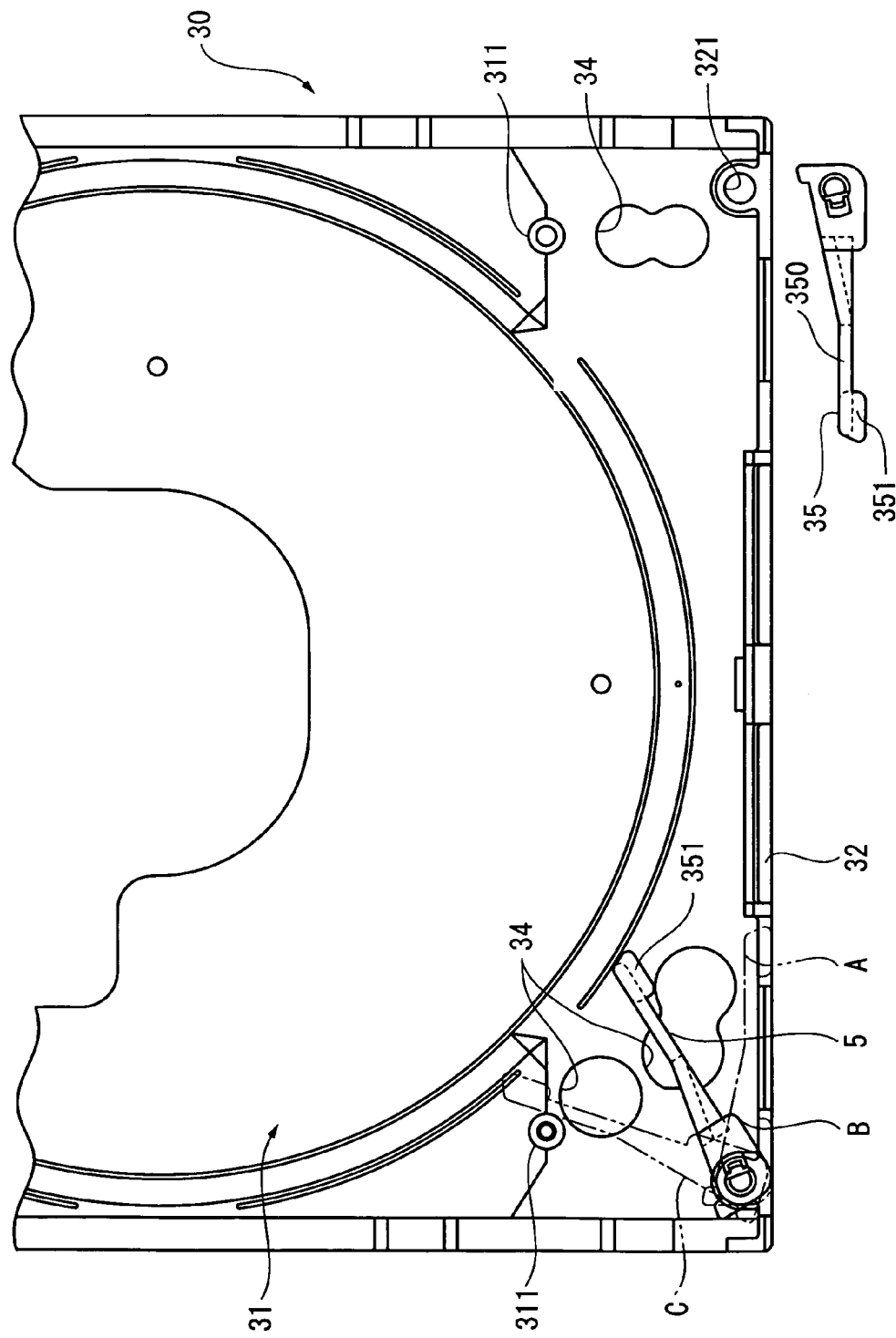
FIG. 8 is a front view showing a part of the tray of FIG. 7 in an enlarged manner.

FIG. 7 is a perspective view of the tray 30. FIG. 8 is a front view on the front side of the tray 30. The tray 30 is made of synthetic resin such as ABS resin and includes a placing surface 31 formed in a rectangular shape in plan view and a rising portion 32 rising from a peripheral of the placing surface 31 on the front side. Linear grooves (not shown) are integrally formed in lateral surfaces of the tray 30 on the bottom side along a direction in which the tray 30 ejects and retracts. The sliding pieces 150 of the lateral portions 15 engage with the grooves. The grooves and the sliding pieces 150 enable the tray 30 to smoothly eject and retract in the advancement and retreat direction. The placing surface 31 can mount either the cartridge type or bare-disc type recording medium. To mount the bare-disc type, the circular hole is provided.

A slider 33 as a positioning member for the recording medium and made of synthetic resin or the like, is provided on the rear side of the tray 30. The slider 33 is biased toward the front side by an elastic member such as a spring (not shown). Hence, when the cartridge type recording medium is placed on the placing surface 31, the slider 33 and the rising portion 32 can sandwich to position the cartridge.

An arc portion 33A is formed on the front side of the slider 33 as a guide for positioning the bare-disc type recording medium when being placed on the placing surface 31. When a bare disc is placed on the placing surface 31, if the slider 33 is biased toward the front side by the not shown elastic member, the slider 33 may interfere with a circumference of the bare disc to hinder the rotation of the bare disc. Hence, the slider 33 is provided with a slider positioning portion (not shown). The slider positioning portion controls the arc portion 33A of the slider 33 not to move further than a position fit along the circumference of the bare disc toward the front side. A holder piece 331 is also provided to the slider 33 at a part of the arc portion 33A on the upper side so as to be confronting and parallel to the placing surface 31. The holder piece 331 covers a part of the circumference of the bare disc, when the disc is placed on the placing surface 31.

A disc holder 35 is rotatably attached to both ends of the rising portion 32 of the tray 30. The disc holder 35 has a long holder body 350; a plate-like holder piece 351 at a tip end portion of the disc holder 35, which is integrally formed with the holder body 350 so as to face the placing surface 31; and a rotary pin (not shown) provided at a base end portion of the disc holder 35 so as to be perpendicular to the placing surface 31. The holder piece 351 at the tip end portion of the disc holder 35 is rotatable between an inner lateral surface of the rising portion 32 and an inner lateral surface of the tray 30. A holder supporting hole 321 is defined in both ends of the rising portion 32 of the tray 30 in the up-down directions. The rotary pin of the disc holder 35 is inserted through the holder supporting hole 321. The disc holder 35 is rotatably attached in the holder supporting hole 321.

A detection hole 34 as a detection portion is defined in both ends on the front side of the placing surface 31 of the tray 30. When the tray 30 is housed in the frame 10 and the base 20 swings to move the disc table 23 toward the tray 30 side, the detection pin 611 of the detection board 60 attached to the base 20 also moves toward the tray 30 side. When being moved, the detection pin 611 is inserted through the detection hole 34 to project outward from the placing surface 31 on the upper side. The detection pin 611 is used to detect the information on the cartridge type recording medium, when the cartridge type recording medium is placed on the placing surface 31.

Specifically, the detection pin 611 projecting from the placing surface 31, which is provided at the tip end portion of the detection switch 61, is used to detect the information of the cartridge type recording medium from the cartridge information portion 95 defined in the recording medium (see FIG. 6).

For example, some in-cartridge type recording media can be selected to be writable or unwritable and each have the cartridge information portion 95 for allowing or prohibiting writing in the cartridge. The cartridge information portion 95 is closed to allow writing or is open to prohibit writing.

The placing surface 31 has the detection hole 34 at the position corresponding to the position of the cartridge information portion 95 and the detection pin 611 is projecting from the detection hole 34. When the cartridge information portion 95 is open, a tip end portion of the detection pin 611 can be inserted in the cartridge information portion 95, thereby judging that writing on the recording medium is prohibited. On the other hand, when the cartridge information portion 95 is closed, the detection pin 611 cannot be inserted in the detection hole 34, so that the detection switch 61 is pressed, thereby judging that writing is allowed. The information indicated by the cartridge information portion 95 is not limited to whether writing is allowed or prohibited, but may be another information such as a memory capacity of the cartridge type recording medium. When the cartridge includes a variety of information, the placing surface 31 preferably has more detection holes 34 or the detection hole 34 preferably has a bigger size.

The substantial center of the placing surface 31 of the tray 30 is a position in which the disc table 23 is inserted. An operation opening 36 is defined from this position toward the rear side. Not only the disc table 23 to be engaged with the recording medium placed on the placing surface 31 but also a laser beam irradiated to the recording surface of the recording medium by the recording/reproducing mechanism 27 for reproducing or recording on the recording medium penetrate through the operation opening 36.

[Placing Recording Medium]

The disc holder 35 of the tray 30 can position the recording medium at a best position depending to the type of the recording medium or how the recording medium drive is set. First, a case where the recording medium drive 100 is set such that the placing surface 31 of the tray 30 is horizontal (in the horizontal setting) will be described. When the recording medium is the bare type, the disc holder 35 is preferably at the position B in FIG. 8. In other words, the two disc holders 35 are at the horizontal setting supporting position B (shown in a solid line in FIG. 8) that enables the tip end portions of the disc holders 35 to contact the circumference of the bare disc. At the position B, the disc holder 35 can position the bare disc not to be horizontally displaced. At this time, the disc holder 35 is preferably positioned so as to contact the circumference of the bare disc gently or with a little space not to hinder the rotation of the bare disc when the bare disc is captured and rotated at high speed by the disc table 23.

When the recording medium is the cartridge type, the disc holder 35 is at an accommodation position A shown in the chain line in FIG. 8 so as to contact the rising portion 32. The placing surface 31 is provided with an engagement projection 311 for positioning the cartridge, which are projecting from the placing surface 31 toward the upper side. The cartridge is provided with an engagement recess 96 at a predetermined position to engage with the engagement projection 311 (see FIG. 10). The cartridge is positioned by engaging the engagement projection 311 in the engagement recess 96. As described above, the recording medium drive 100 of the embodiment is arranged such that the cartridge is biased by the slider 33 toward the front side. Hence, the cartridge can be reliably positioned by being sandwiched by the slider 33 and the rising portion 32 not to be displaced in a plane direction. Since the disc holder 35 can be moved to the accommodation position A at the rising portion 32, a sufficient space for mounting the cartridge can be obtained. In addition, since the space on the placing surface 31 of the tray 30 is sufficient as compared to prior arts, the position, size and amount of the detection hole 34 can be determined more freely, thereby enabling the detection pin 611 to collect a variety of different information of the cartridge type recording medium. Further, since the disc holder 35 is accommodated at the rising portion 32, the detection switch 61 projecting from the placing surface 31 and the detection hole 34 can be prevented from being interfered by the disc holder 35.

Next, a case where the recording medium drive 100 is set such that the placing surface 31 of the tray 30 is vertical (in the vertical setting) will be described. When the recording medium is the bare type, the disc holder 35 is at the vertical setting supporting position C shown in a chain double-dashed line in FIG. 8. That is, the disc holder 35 is swung to the position to contact the engagement projection 311 such that the tip end portion of the disc holder 35 contacts a part of the circumference of the bare disc. The holder piece 351 is provided at the tip end portion of the disc holder 35 to be confronting and parallel to the placing surface 31. The disc holder 35 contacts the circumference of the bare disc at a position between the holder piece 351 and the placing surface 31. On the rear side, the holder piece 331 provided on the front side of the slider 33 is disposed to cover a part of the circumference of the bare disc. The holder pieces 351, 331 prevent the bare disc from dropping off the placing surface 31. The holder pieces 351, 331 and the placing surface 31 have a space therebetween such that the bare disc does not interfere the holder pieces 351, 331 when the disc table 23 captures the bare disc. The bare disc can be reliably supported by one disc holder 35 on the downside in the vertical direction. However, the other disc holder 35 may also be positioned at the vertical setting supporting position C, or only the other disc holder 35 may be positioned at the horizontal setting supporting position B.

When the recording medium is the cartridge type, the recording medium drive 100 can be set in the same manner either in the horizontal setting or the vertical setting. Hence, the explanation about the vertical setting will be omitted.

[Arrangement of Clamp Mechanism 40]

As shown in FIGS. 1 and 2, the clamp mechanism 40 is attached to the upper opening portion 13 of the frame 10, as described above. The clamp mechanism 40 has a function for holding the recording medium engaged with the disc table 23 so as not to drop off from the disc table 23. The clamp mechanism 40 has a damper 41 at a position facing the disc table 23, the damper 41 being supported by a damper holder 42. The damper 41 is made of synthetic resin and has a discoid metal member (not shown) embedded in a central portion thereof on the upper side. The damper holder 42 is provided with a plate spring 43 that applies a bias toward the upper side when the damper holder 42 is moved toward the bottom side.

[Engagement of Recording Medium]

When the tray 30 is housed in the frame 10 with the recording medium placed on the placing surface 31 of the tray 30, the circular hole 93 of the disc 91 is engaged with the tapered portion 231 of the disc table 23 and the disc 91 is placed and captured on the sheet 232A of the mounting portion 232. Since the magnet is embedded in the tapered portion 231 of the disc table 23, the disc 91 can be held by the damper 41, thereby the disc 91 can be fixed not to drop off the disc table 23. At this time, the damper 41 contacts the disc table 23 side due to the magnet 231A of the disc table 23 and the damper holder 42 also moves toward the bottom side. The disc table 23 rotates at high speed for reproduction of and/or recording on the disc 91 such that the information on the recording surface is reproduced and/or information is recorded on the recording surface by the recording/reproducing mechanism 27.

When the disc 91 is ejected, the disc table 23 is moved toward the bottom side, thereby separating the magnet 231A and the damper 41, the damper 41 being pressed by the plate spring 43 to move toward the upper side together with the damper holder 42. When the disc table 23 is moved to the bottom side of the placing surface 31, the disc is placed on the upper side of the placing surface 31, so that the recording medium can be removed by ejecting the tray 30 from the frame 10.

[Connection between Base 20 and Tray 30]

In FIGS. 2, 3 and 4, an interlocking mechanism 500 is provided on the front side of the frame 10. The interlocking mechanism 500 includes a drive cam 50 engaging with the base 20, a first rack 52 integrally formed with the drive cam 50, a gear mechanism 53 meshing with the first rack 52 and having a first gear 531 through a fourth gear 534, a motor 54 meshing with the gear mechanism 53 and controlled and driven by the electric circuit, and a second rack (not shown) provided on the bottom side of the tray 30 and meshing with the gear mechanism 53.

The drive cam 50 is made of synthetic resin or the like and reciprocatably disposed in the lateral direction orthogonal to the advancement and retreat directions of the tray 30. A cam groove 51 extending in the lateral directions is formed on the rear side of the drive cam 50, the cam groove 51 being engaged with the cam engaging pin 24 of the base 20. The cam groove 51 is formed with an inclination such that one end thereof is disposed on the upper side and the other end is disposed on the bottom side. When the drive cam 50 reciprocates in the lateral directions, the cam engaging pin 24 is moved along the inclined part between both ends of the cam groove 51, which enables the base 20 to reciprocate in the up-down directions.

The first rack 52 formed on one lateral surface of the drive cam 50 meshes with the third gear 533 of the gear mechanism 53. The second gear 532 having larger diameter than the third gear 533 is integrally formed on the bottom side of the third gear 533, the second gear 532 meshing with the first gear 531 and the fourth gear 534. The first gear 531 meshes with a motor gear 542 of the motor 54. The motor gear 542 is connected with a wheel 541 by a ring-shaped belt 543 made of synthetic resin. A motor body (not shown) is provided on the bottom side of the wheel 541 via the frame 10, so that the motor body directly supplies driving force to the wheel 541. The motor body is electrically connected to the electric circuit, so that rotation of the motor body is controlled by the electric circuit. The fourth gear 534 meshes with the second rack (not shown) provided on the bottom side of the tray 30.

When a command for ejecting/retracting the tray is transmitted to the electric circuit by an input from the eject button (not shown) or the outside, the electric circuit drives the motor body. When the motor body is rotated, the rotation thereof is transmitted to the first gear 531 of the gear mechanism 53 via the wheel 541 and the motor gear 542. The rotation is then transmitted from the first gear 531 to the second gear 532, thereby rotating the third gear 533 integrally formed with the second gear and the fourth gear 534 meshing with the second gear 532. The rotation of the third gear 533 causes the drive cam 50 meshing with the third gear 533 through the first rack 52 to move in the lateral directions, so that the base 20 engaging with the drive cam 50 is moved toward the upper side or the bottom side. The rotation of the fourth gear 534 causes the tray 30 meshing with the fourth gear 534 through the second rack to move towards the rear side or the front side.

Thus, the base 20 and the tray 30 are connected by the drive cam 50 and the gear mechanism 53. When the tray 30 is ejected, the disc table 23 is moved to the waiting position first. Then, the tray 30 can be ejected.

[Operation of Disc Table 23]

Movement of the disc table 23 at a time when the base 20 swings will be described based on FIGS. 5, 6 and 9.

Figure 9:
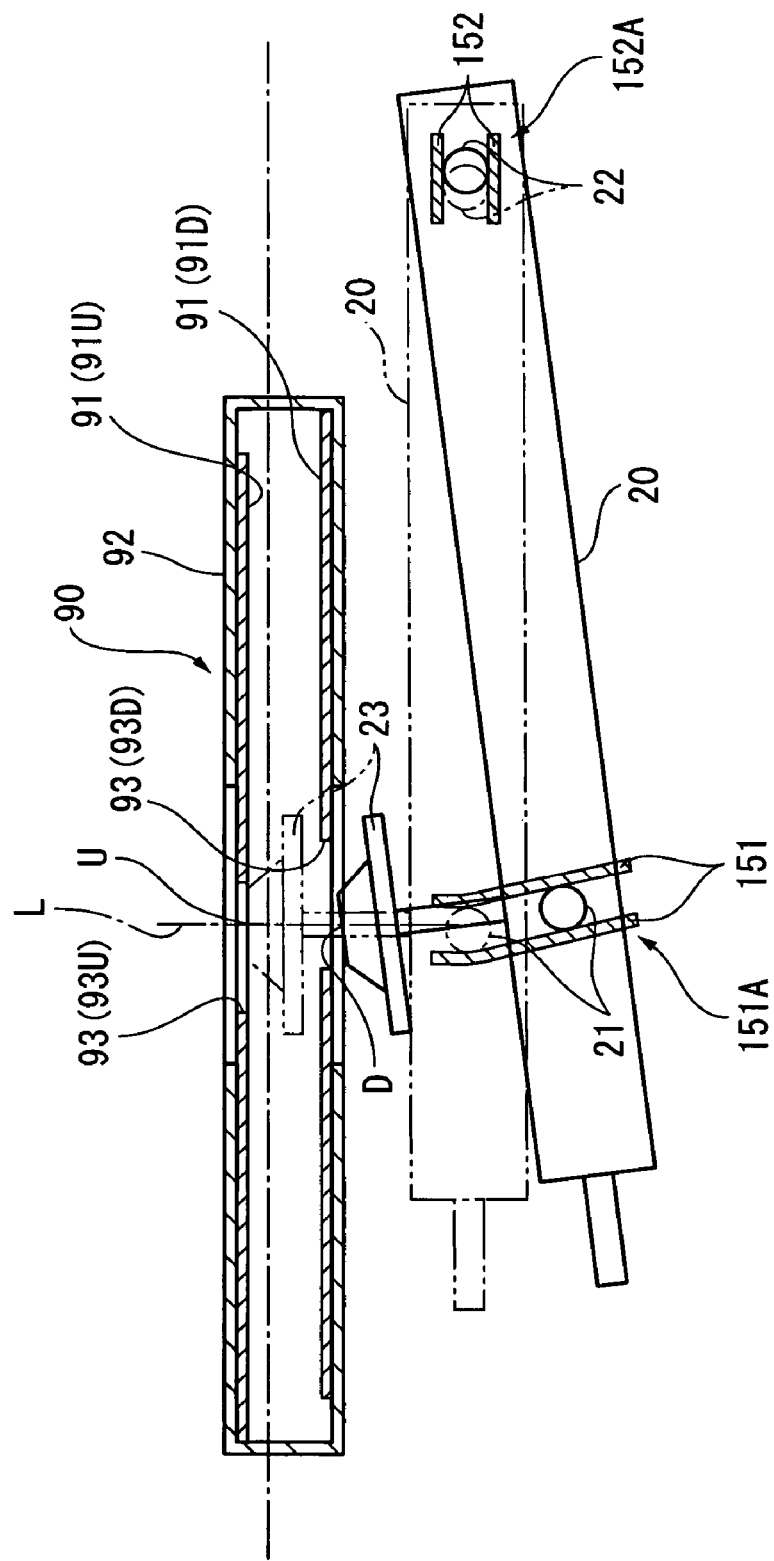
FIG. 9 is an illustration showing a movement of the base 20 of the recording medium drive.

FIG. 9 is an illustration showing positions of the disc table 23 at the time when the base 20 swings. In FIG. 9, the cartridge type recording medium 90 is placed on the placing surface 31. The disc 91 can move freely in the cartridge 92, so that the circular hole 93 defined at the center of the disc 91 may be displaced from the center of the cartridge 92. A position where the disc table 23 captures the disc 91 when the disc 91 is positioned on the bottom side of the cartridge 92 is defined as the capture position D and the disc at the capture position D as the disc 91D. Meanwhile, a position where the disc table 23 captures the disc 91 when the disc 91 is positioned on the upper side of the cartridge 92 is defined as the capture position U and the disc at the capture position U as the disc 91U.

As described above, the base 20 is controlled by the first guide mechanism 151A and the second guide mechanism 152A such that the substantial center of the disc table 23 draws a movement track on the chain line L. Specifically, the disc table 23 linearly moves so as not to drop off from the circular hole of the recording medium in the cartridge 92, thereby enabling the recording medium to be reliably captured even when the capture position of the recording medium changes. For example, also as described above, when the recording medium drive 100 is vertically set, the capture position may vary due to the weight of the disc 91 and the disc 91 may move to the position 91U or 91D in the cartridge 92, which are shown in the figure, or a position therebetween. Hence, the capture position of the disc 91 may be the capture position D or the capture position U (see FIG. 9). In this case, since the circular hole 93D of the disc 91D and the circular hole 93U of the disc 91U are respectively displaced toward the front side and the rear side, the disc table may be positioned in the circular hole of the disc at the capture position D, but a capture failure may possibly occur at the capture position U due to the displacement from the center of the disc table in the conventional arrangement where the substantial center of the disc table draws an arc track (not on the chain line L). In the present embodiment, since the track of the substantial center of the disc table 23 linearly moves not to displace from the circular hole of the recording medium of the cartridge 92, the displacement between the disc table 23 and the circular hole of the recording medium does not become large enough to cause the capture failure even when the capture position of the disc 91 changes, thereby enabling the disc table 23 to reliably capture the disc 91D. According to the embodiment, either in the vertical setting or the horizontal setting, the center displacement at the capture position can be absorbed to decrease the capture failure.

[Effects and Advantages of Recording Medium Drive 100 of First Embodiment]

The above described recording medium drive 100 provides advantages as explained below.

(1) Both of the cartridge type and bare-disc type recording medium can be placed. The tray 30 has: the placing surface 31 that mounts the recording medium and has the detection portion for detecting the information of the recording medium when the cartridge type recording medium is placed thereon; and the rising portion 32 formed to rise from the front side end of the placing surface 31, the rising portion 32 having the disc holder 35 rotatably provided between the accommodation position A and the vertical setting supporting position C for positioning the bare-disc type recording medium. Therefore, the disc holder 35 can be displaced to the accommodation position A so as not to cover the detection hole 34 of the placing surface 31. Accordingly, on the placing surface 31, the area that can be used for the detection portion such as the detection hole 34 can be larger, the detection portion such as the detection hole 34 for detecting the information of the cartridge when the cartridge type recording medium is placed can be sufficiently formed. When the more information the cartridge includes, the more detection holes 34 in the placing surface 31 are necessary or the larger the detection hole 34 becomes. However, the placing surface 31 has the sufficient area, so that such detection hole 34 can be easily formed.

(2) Since the tray 30 is provided with the detection hole 34 as the detection portion; and the detection pin 611 is inserted through the detection hole 34 from the bottom side to the upper side, the detection pin 611 can detect the information from the cartridge information portion 95 when the cartridge type recording medium is placed on the placing surface 31. Hence, the detection portion does not require a complicate structure, but can detect the information of the cartridge with such simple structure, so that assembling efficiency can be improved.

(3) Since the disc holders 35 are provided at both ends of the rising portion 32, the disc holder 35 can be positioned so as to sandwich the disc by being moved to the horizontal setting supporting position B and the horizontal setting supporting position C. Thus, in the horizontal setting, the disc can be reliably positioned not to be displaced from the placing surface 31 of the tray 30.

(4) When the bare-disc type recording medium is set such that the recording medium drive becomes horizontal, the bare-disc is positioned at the horizontal setting supporting position B to enable the circumference of the bare disc and the tip end portion of the disc holder 35 to contact with each other. When the bare-disc type recording medium is set such that the recording medium drive becomes vertical, the circumference of the bare disc and the tip end portion of the disc holder 35 contact with each other and the disc holder 35 is disposed at the vertical setting supporting position C for supporting the circumference of the bare disc between the placing surface 31 and the holder piece 351 provided to face the placing surface 31 at the tip end portion of the bare disc, so that the disc holder 35 can be rotatable between the horizontal setting supporting position B and the vertical setting supporting position C. Therefore, the disc holder 35 can be switched between the vertical setting and the horizontal setting only by being swung, so that the bare-disc can be reliably positioned, thereby facilitating the structure thereof and operability.

(5) Since the base 20 is swingably attached to the frame 10 and the guide mechanism is provided such that the disc table 23 is moved perpendicularly relative to the capture surface of the recording medium and on the straight line passing through the center of the recording medium, the center displacement of the disc table 23 does not occur, thereby enabling the recording medium to be reliably captured even when the disc 91 of the cartridge type recording medium is considerably displaced. Thus, the capture failure due to the center displacement can be thoroughly prevented, so that accuracy of recording and/or reproduction of the recording medium drive 100 is highly improved.

(6) Since the first guide mechanism 151A guides the disc table 23 such that the track of the substantial center of the disc table 23 is perpendicular to the capture surface, and the second guide mechanism 152A guides such that the rear side end of the base 20 is displaced in the advancement and retreat direction orthogonal to the movement track of the substantial center of the disc table 23, the guide mechanism can be segmentalized into two different guide mechanisms for the respective guiding functions. Hence, the guide mechanisms do not require a complicate structure, but can reliably prevent the center displacement of the disc table 23.

(7) Since the first guide mechanism 151A is arranged such that the first axis 21 projecting toward the lateral direction from the base 20 is engaged in the first guide groove 151 in the lateral portion 15 of the frame 10, the movement track of the substantial center of the disc table 23 can be easily guided to be perpendicular to the capture surface only by moving the first axis 21 along the first guide groove 151. In addition, the first guide mechanism does not require a complicate structure, thereby improving assembling efficiency and reducing production cost.

(8) Since the second guide mechanism 152A is arranged such that the second axis 22 projecting toward the lateral direction from the base 20 at the rear side end is engaged in the second guide opening 152 in the lateral portion 15 of the frame 10 on the rear side, the base 20 can be easily moved in the advancement and retreat direction only by moving the second axis 22 along the second guide opening 152. Thus, when the base 20 is moved along the first guide mechanism 151A to the waiting position, the second axis 22 can be moved toward the rear side of the disc table 23, and when the base 20 is moved upward along the first guide mechanism 151A to the position for capturing the recording medium, the second axis 22 can be moved toward the front side direction. Hence, the base 20 can be guided to smoothly swing. In addition, the base 20 does not require a complicate structure, thereby improving assembling efficiency and reducing production cost.

(9) Since the swing of the base 20 is in conjunction with the ejecting and retreating movement of the tray 30 via the interlocking mechanism 500, the base 20 can be operated in a series to be moved to the capture position of the recording medium when the tray 30 is housed in the frame 10, and to the waiting position when the tray 30 is ejected. Therefore, the ejecting and retreating of the tray 30 and the swing of the base 20 can be controlled together by controlling the movement of the interlocking mechanism 500, so that the tray 30 and the base 20 do not require own mechanism for the movements, thereby reducing the number of the members and obtaining efficient usage of the space in the frame 10.

(10) Since the first guide mechanism 151A is provided to each of the inner surfaces of the lateral surfaces of the frame 10 to guide the swing of the base 20, the base 20 can be prevented from inclining toward the lateral surfaces.

(11) Since the engagement projection 311 projecting toward the upper side from the placing surface 31 of the tray 30 is provided, when the cartridge type recording medium is placed, the cartridge type recording medium can be positioned by engaging the engagement projection 311 with the recess in the cartridge. When the bare-disc type recording medium is set in the vertical posture, the disc holder 35 is rotated in contact with or near the engagement projection 311, so that the disc holder 35 can be positioned at the vertical setting supporting position C, thereby reliably positioning the bare disc. The engagement projection may be provided to the base 20.

Second Embodiment

Figure 11:
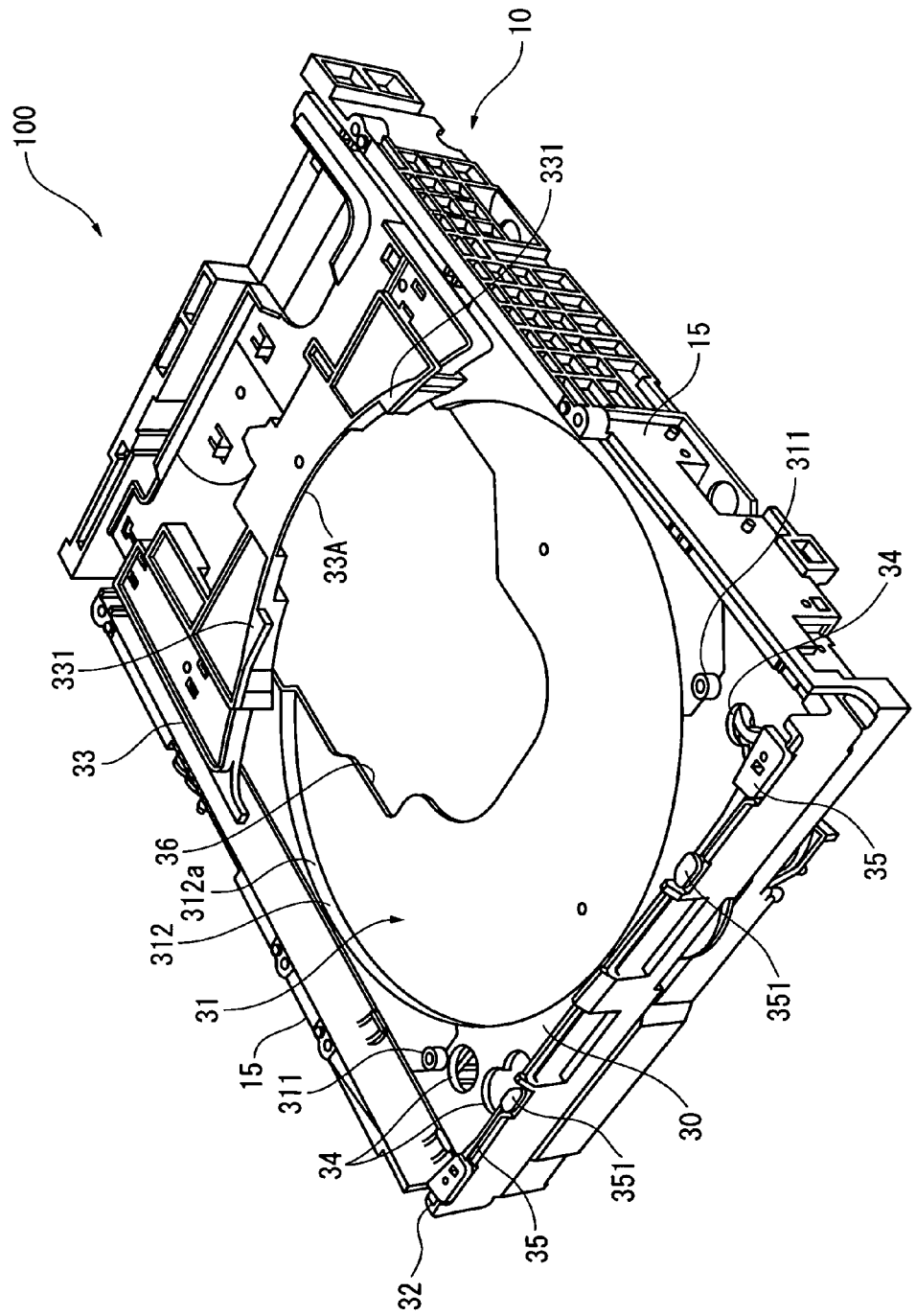
FIG. 11 is an overall perspective view showing a recording medium drive of a second embodiment when being horizontally set.
Figure 12:
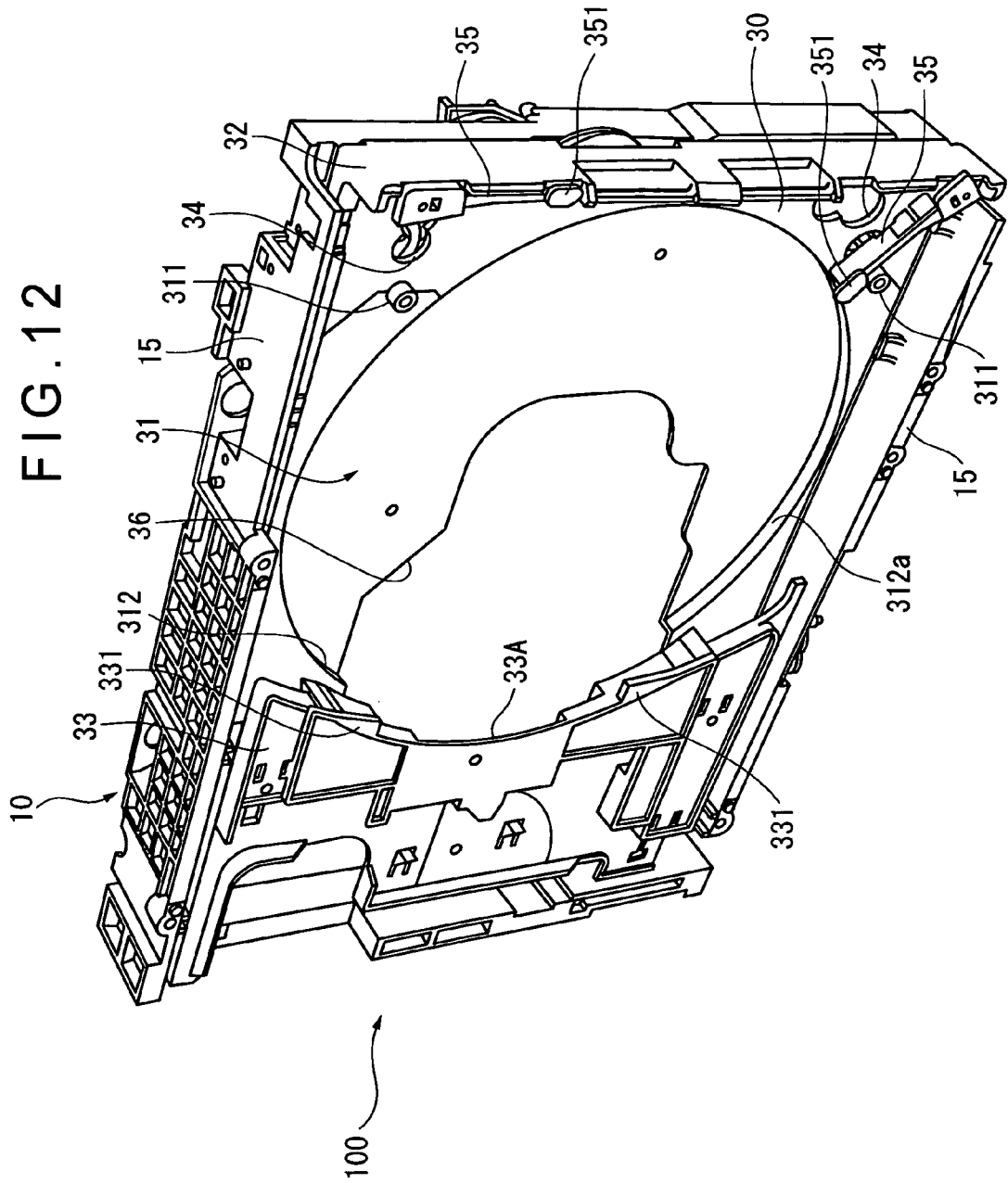
FIG. 12 is another overall perspective view showing the recording medium drive when being vertically set.
Figure 13:
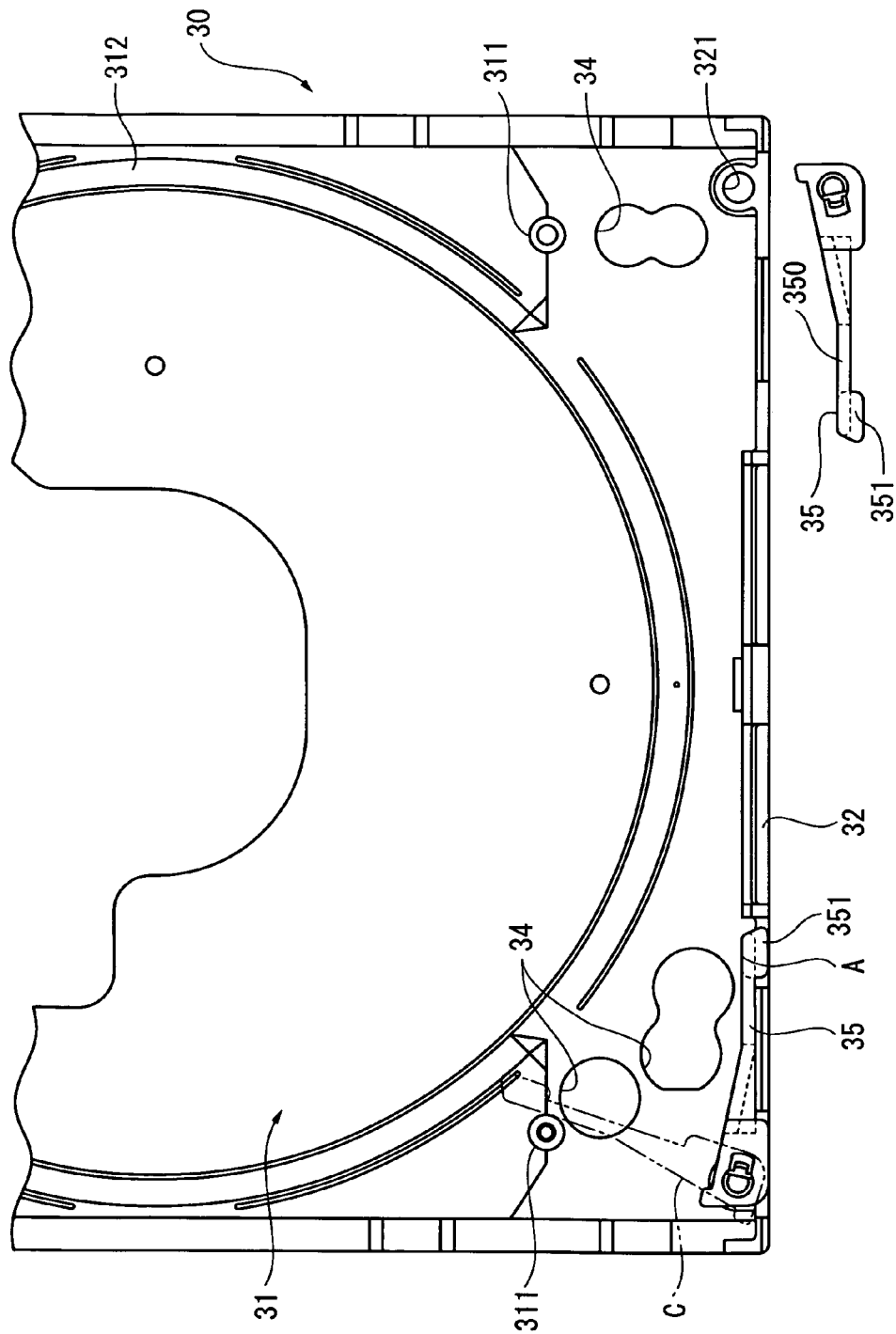
FIG. 13 is a front view showing a primary portion of a tray 30 of FIGS. 11 and 12 in an enlarged manner.

Next, a second embodiment of the present invention will be described with reference to FIGS. 11 to 13. FIG. 11 is an overall perspective view of a recording medium drive of the present embodiment when being horizontally set. FIG. 12 is another overall perspective view showing the recording medium drive when being vertically set. FIG. 13 is a front view showing a primary portion of a tray 30 of FIGS. 11 and 12 in an enlarged manner. Note that FIGS. 11 and 12 show the recording medium drive 100 in a simplified manner with the clamp mechanism 40 removed. The recording medium drive 100 of the second embodiment has similar arrangements to the arrangements of the recording medium drive 100 of the first embodiment. Hence, only differences from the recording medium drive 100 of the first embodiment will be described below.

[Arrangement of Tray 30]

In FIGS. 11 and 12, the recording medium drive 100 of the embodiment has differences in the arrangement of the tray 30 from the recording medium drive 100 of the first embodiment. According to the embodiment, the placing surface 31 of the tray 30 has a circular recessed portion 312 for placing the disc 91 of the bare-disc type, which has a predetermined depth. A depth of a wall 312a of the circular recessed portion 312 needs to be appropriate and may be a length similar to the thickness of the disc or a length to enable the bare-disc type recording medium to be reliably positioned. The diameter of the circular recessed portion 312 is preferably somewhat larger than the diameter of the bare-disc type recording medium. Accordingly, when the bare-disc type recording medium is placed, the recording medium has an appropriate distance from the wall 312a of the circular recessed portion 312. Thus, when being placed on the placing surface 31, the bare-disc type recording medium can be easily placed.

How to place the recording medium in the recording medium drive 100 of the embodiment will be described below based on the figures. First, a case where the recording medium drive 100 of the embodiment is set such that the placing surface 31 of the tray 30 is horizontal (in the horizontal setting) will be described with FIGS. 11 and 13. In this case, the bare-disc type recording medium is placed so as to be accommodated in the circular recessed portion 312 of the tray 30. The cartridge type recording medium is placed with the engagement recess 96 of the cartridge being engaged with the engagement projection 311 of the tray 30. The slider 33 biases the cartridge toward the front side, so that the cartridge is sandwiched by the slider 33 and the rising portion 32, thereby the cartridge being reliably fixed.

Next, a case where the recording medium drive 100 of the embodiment is set such that the placing surface 31 of the tray 30 is vertical (in the vertical setting) will be described with FIGS. 12 and 13. When the bare-disc type recording medium is placed, the bare disc is placed with the disc holder 35 having a lower position relative to the other disc holder 35 swung to the position to contact the engagement projection 311 (the vertical setting supporting position C). In this state, a part of the circumference of the bare-disc type recording medium is covered by the holder piece 351 at the tip end portion of the disc holder 35 and the holder piece 331 of the slider 33 and fixed at a predetermined position because the tip end portion of the disc holder 35 contacts the circumference of the bare disc.

When the cartridge type of the recording medium is placed, the recording medium drive 100 can be set in the same manner either in the horizontal setting or the vertical setting. Hence, the explanation about the vertical setting will be omitted.

When the recording medium drive 100 of the embodiment is vertically set, either of the lateral portions 15 on the right or the left relative to the advancement direction of the tray 30 (the direction in which the tray is moved to be housed in the recording medium drive) may be a bottom surface regardless of the type of the recording medium to be used. FIG. 12 shows a state in the vertical setting with the left lateral portion 15 serving as the bottom surface. When the bare-disc type recording medium is placed, the disc holder 35 on the left relative to the advancement direction of the tray 30 is swung to the vertical setting supporting position C for use. On the other hand, in the vertical setting where the right lateral portion 15 serves as the bottom surface, the disc holder 35 on the right relative to the advancement direction of the tray 30 is swung to the vertical setting supporting position C. No matter which lateral surface serves as the bottom surface, it is obvious that both of the disc holders 35 on the right and left may be swung for use. This feature can be applied to the recording medium drive 100 of the first embodiment of the invention.

[Effects and Advantages of Recording Medium Drive 100 of Second Embodiment]

As described above, the second embodiment can achieve not only the advantages of the first embodiment (1), (2) (5) to (11), but also the advantages that will be described below.

(12) The recording medium drive 100 of the embodiment has the arrangements same as the first embodiment and the arrangement in which the placing surface 31 of the tray 30 is provided with the circular recessed portion 312 of the predetermined depth for placing the bare-disc. Accordingly, when the bare-disc type recording medium is placed on the placing surface 31 when the drive is horizontally placed, the disc holder 35 is not necessary for positioning the bare disc. Even when the tray 30 is moved in the advancement and retreat direction, the recording medium is not displaced to a large extent to disenable the positioning. The tray 30 of the first embodiment can be provided with the circular recessed portion 312. When being provided, the first embodiment can achieve not only the advantages (1) to (11) described above but also the same advantages as the second embodiment. The circular recessed portion 312 of the tray 30 only needs to have an appropriate size and depth for reliably enabling the positioning of the bare-disc type recording medium.

(13) The placing surface 31 of the tray 30 of the embodiment has the circular recessed portion 312 for placing the disc 91, which has a predetermined height. Hence, in both of the bare-disc type recording medium and the cartridge type recording medium when the drive is horizontally set, the disc holder 35 only needs to be positioned in the accommodated state at the rising portion 32 (at the accommodation position A) and no switching depending on the recording medium type is necessary. Thereby, convenience and operability thereof can be improved.

Modifications of Embodiments

It is to be noted that the recording medium drive of the invention is not limited to the above described two embodiments, but includes various improvements and variations in the design as long as an object of the present invention can be achieved.

For example, when the cartridge type recording medium is used, the detection pin 611 is provided as a detector for detecting the information of the cartridge information portion 95 in the embodiments, but the detector is not limited thereto. The detector may be, for example, an infrared ray sensor.

As another example, the embodiments are arranged such that the detection board 60 having the detector is fixed to the base 20 and the detection pin 611 is inserted into the detection hole 34 of the tray 30 when the base 20 is swung to come to the capture surface, but the detector may be provided to the tray 30. In this arrangement, the detector may be disposed on the bottom side of the tray 30 to be always projecting from the detection hole 34, or the detector may be operated after the tray 30 is inserted in the frame 10.

In the embodiments, the disc holders 35 are provided to the rising portion 32 on the front side ends of the tray 30, but the arrangement is not limited thereto. For example, the disc holders may be disposed to the rising portion 32 at two positions on one of the lateral sides or on both lateral sides or on the rear side. In the embodiments, the two disc holders 35 are provided, but the number is not limited thereto. For example, the number may be four. When two of the disc holders 35 are arranged to the rising portion 32 on the front side and the other two disc holders 35 to the rear side, the disc holders 35 alone can position the recording medium without the function of the slider 33. The disc holder 35 may be provided only to one of the two ends of the rising portion 32. In this arrangement, the disc holder 35 only needs to be positioned at a lower end of the rising portion 32, when the drive body is vertically set. The tray 30 can have a simple structure by arranging such that one disc holder 35 is provided.

In the embodiments, the first guide mechanisms 151A are provided in the lateral directions of the disc table 23, but the position is not limited thereto. For example, the guide mechanism 151A may be positioned on the rear side or the front side of the position according to the embodiments. That is, it is only necessary to arrange such that the guide mechanism 151A guides the movement track of the disc table 23 to be vertical relative to the capture surface and pass through the center of the recording medium.

In the embodiments, the second guide opening 152 is provided by fixing the axis supporter 153 to the flat section 154 of the lateral portion 15, but the arrangement is not limited thereto. For example, the axis supporter 153 may be integrally formed to the lateral portion of the frame 10. In this arrangement, the flat section 154 of the lateral portion 15 does not need the bearing projection 154A, the bearing hole 154B or the screw for attaching the axis supporter 153. However, the engaging work of the second axis 22 of the base 20 and the second guide opening 152 becomes difficult. Hence, for example, the second axis 22 needs to be able to be accommodated inside, and after the second axis 22 is engaged with the second guide opening 152, the second axis 22 needs to be fixed to the base 20.

In the embodiments, the first guide mechanism 151A and the second guide mechanism 152A displace the base 20 toward the front side at the waiting position and toward the rear side at the capture position, but the arrangement is not limited thereto. For example, the base 20 may be displaced toward the rear side at the waiting position and toward the front side at the capture position with the substantial center of the disc table 23 passing through the center of the recording medium vertically relative to the capture surface. However, in this arrangement, the mounting portion 232 of the disc table 23 is inclined at the capture position, so that a capture failure may possibly occur in the horizontal setting of the recording medium. To prevent the capture failure, the placing surface 31 can be arranged to be inclined to make inclination angles of the placing surface 31 of the tray 30 and of the mounting portion 232 of the disc table 23 substantially equal, thereby preventing the disc table 23 and the recording medium from being inclined into contact.

In the embodiments, the first guide grooves 151 are respectively formed in the lateral portions 15, but the arrangement is not limited thereto. For example, the first guide groove may be provided in only one lateral portion 15. However, in this arrangement, the base 20 may incline relative to the capture surface, so that a guide member for keeping the base 20 horizontal relative to the capture surface becomes necessary. Therefore, in the embodiments, it is preferably to provide the first guide grooves 151 to the respective lateral portions 15.

In the embodiments, the recording medium drive 100 can operate for both of the cartridge type recording medium and the bare-disc type recording medium, but the recording medium drive 100 is not limited thereto. For example, the recording medium drive 100 may be able to handle only the cartridge type recording medium or the bare-disc type recording medium.

Effects and Advantages of Embodiments

The recording medium drive according to the embodiments includes the tray 30 that can mount both of the cartridge type recording medium in which the disc body is housed in the cartridge and the bare-disc type recording medium and at least reproduces information from or records information on the recording medium. The tray 30 has the placing surface 31 for placing the recording medium, the rising portion 32 formed so as to rise relative to the placing surface 31 and the disc holder 35 that is provided to the rising portion 32 and rotatable at least between the position for positioning a placing position of the bare-disc type recording medium and the position for being displaced from the cartridge type recording medium when the cartridge type recording medium is placed. Thus, a wider area for forming the detection portions such as the detection hole 34 can be obtained, thereby enabling the placing surface 31 to be efficiently utilized.

INDUSTRIAL APPLICABILITY

The present invention can be applied to a recording medium drive that houses a recording medium placed on a tray of the drive.

The invention claimed is:

1. A recording medium drive having a tray on which both of a cartridge type recording medium and a bare-disc type recording medium can be placed, the drive conducting at least one of reproduction and recording of the recording medium, wherein the tray includes:

a placing surface for placing the recording medium;

a rising portion formed so as to rise relative to the placing surface; and a disc holder provided to the rising portion and rotatable at least between a position for determining where to place the bare-disc type recording medium and a position for being displaced from the cartridge type recording medium when the cartridge type recording medium is placed, and the disc holder is rotatable between: a horizontal setting supporting position for guiding a circumference of the bare-disc type recording medium when the bare-disc type recording medium is horizontally set; and a vertical setting supporting position where the circumference of the bare-disc type recording medium and a tip end of the disc holder contact with each other when the bare-disc type recording medium is vertically set and the circumference of the bare-disc type recording medium is supported between the placing surface and a holder piece formed on the disc holder.

2. The recording medium drive according to claim 1, wherein the recording medium drive includes a detection portion for detecting information of the cartridge type recording medium, the detection portion having a detection hole formed to penetrate through a part of the tray and a detection member to be inserted through the detection hole.

3. The recording medium drive according to claim 2, wherein the disc holder is disposed such that a rotation range of the disc holder is positioned above the detection hole.

4. The recording medium drive according to claim 1, wherein a base end portion of the disc holder is provided to at least one end of the rising portion.

5. The recording medium drive according to claim 1, wherein the placing surface has a recessed portion for accommodating the bare-disc type recording medium, the disc holder is provided at a tip end portion thereof with a holder piece for holding a circumference plane of the bare-disc type recording medium, and the disc holder can be accommodated at an accommodation position where the disc holder is to be accommodated at the rising portion when the bare-disc type recording medium or the cartridge type recording medium is horizontally set and is rotatable between the accommodation position and a vertical setting supporting position.

6. The recording medium drive according to claim 1, wherein the tray is provided with a positioning member biased toward a disc holder side for positioning the recording medium, the tray being biased toward the disc holder side via the position member.

* * * * *